United States Patent
Das et al.

(10) Patent No.: US 10,248,691 B2
(45) Date of Patent: Apr. 2, 2019

(54) READ/WRITE SPLIT DATABASE QUERY ROUTING

(71) Applicant: PAYPAL, INC., San Jose, CA (US)

(72) Inventors: Somenath Das, San Jose, CA (US); Kamlakar K. Singh, Foster City, CA (US); Saibabu Devabhaktuni, Fremont, CA (US); Yaping Shi, Cupertino, CA (US); Petrica Lulian Voicu, Union City, CA (US); Kenneth Kang, Campbell, CA (US)

(73) Assignee: PAYPAL, INC., San Jose, CA (US)

( * ) Notice: Subject to any disclaimer, the term of this patent is extended or adjusted under 35 U.S.C. 154(b) by 577 days.

(21) Appl. No.: 14/985,789

(22) Filed: Dec. 31, 2015

(65) Prior Publication Data

US 2017/0017692 A1    Jan. 19, 2017

Related U.S. Application Data

(60) Provisional application No. 62/191,622, filed on Jul. 13, 2015.

(51) Int. Cl.
*G06F 17/30* (2006.01)
*H04L 29/08* (2006.01)

(52) U.S. Cl.
CPC .. *G06F 17/30442* (2013.01); *G06F 17/30067* (2013.01); *G06F 17/30312* (2013.01); *G06F 17/30377* (2013.01); *G06F 17/30457* (2013.01); *G06F 17/30474* (2013.01); *G06F 17/30477* (2013.01); *G06F 17/30545* (2013.01); *G06F 17/30864* (2013.01); *H04L 67/10* (2013.01); *H04L 67/2842* (2013.01); *G06F 2216/13* (2013.01)

(58) Field of Classification Search
CPC ................................................. G06F 17/30442
See application file for complete search history.

(56) References Cited

U.S. PATENT DOCUMENTS

| | | | | |
|---|---|---|---|---|
| 6,496,856 B1* | 12/2002 | Kenner | ............ | G06F 17/30017 348/E5.008 |
| 2008/0019356 A1* | 1/2008 | Marsico | ............ | H04L 29/12132 370/352 |
| 2009/0157641 A1* | 6/2009 | Andersen | .......... | H04L 29/12132 |
| 2010/0125574 A1* | 5/2010 | Navas | ............... | G06F 17/30516 707/722 |
| 2013/0006950 A1* | 1/2013 | Adayilamuriyil | ............ | G06F 17/30584 707/704 |

\* cited by examiner

*Primary Examiner* — Syed H Hasan
(74) *Attorney, Agent, or Firm* — Haynes and Boone, LLP

(57) ABSTRACT

Systems and methods for improving database system performance are described. In one embodiment, a database system includes a database application cluster including at least one read-write node and a plurality of read nodes, a shared memory, and a multiplexer coupled to the database application cluster and shared memory. The multiplexer is configured to receive a request from a client computing system which includes a database query. Based on a lookup in the shared memory, the multiplexer determines that the database query can be routed to one of the plurality of read nodes. In response, the database query is routed to one of the read nodes for execution.

20 Claims, 8 Drawing Sheets

READ/WRITE SPLIT DATABASE QUERY ROUTING

CROSS REFERENCE TO RELATED APPLICATIONS

The present application claims priority to and incorporates by reference U.S. Provisional Patent Application Ser. No. 62/191,622, filed on Jul. 13, 2015.

BACKGROUND

Field

The present disclosure generally relates to database systems, and more particularly, to methods and systems of providing results from database systems.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Transactions facilitated by a payment service provider frequently involve interactions with database systems. For example, a user's request to view his or her transaction history with the payment service provider may require one or more queries to retrieve information from one or more databases of the payment service provider. Similarly, a user's request to perform a new transaction may include one or more queries to write information to one or more databases of the payment service provider. Read and write database queries can be computationally expensive when the databases store large volumes of information.

Thus, there is a need for improved strategies and methods and systems for performing database queries.

Figure 1:
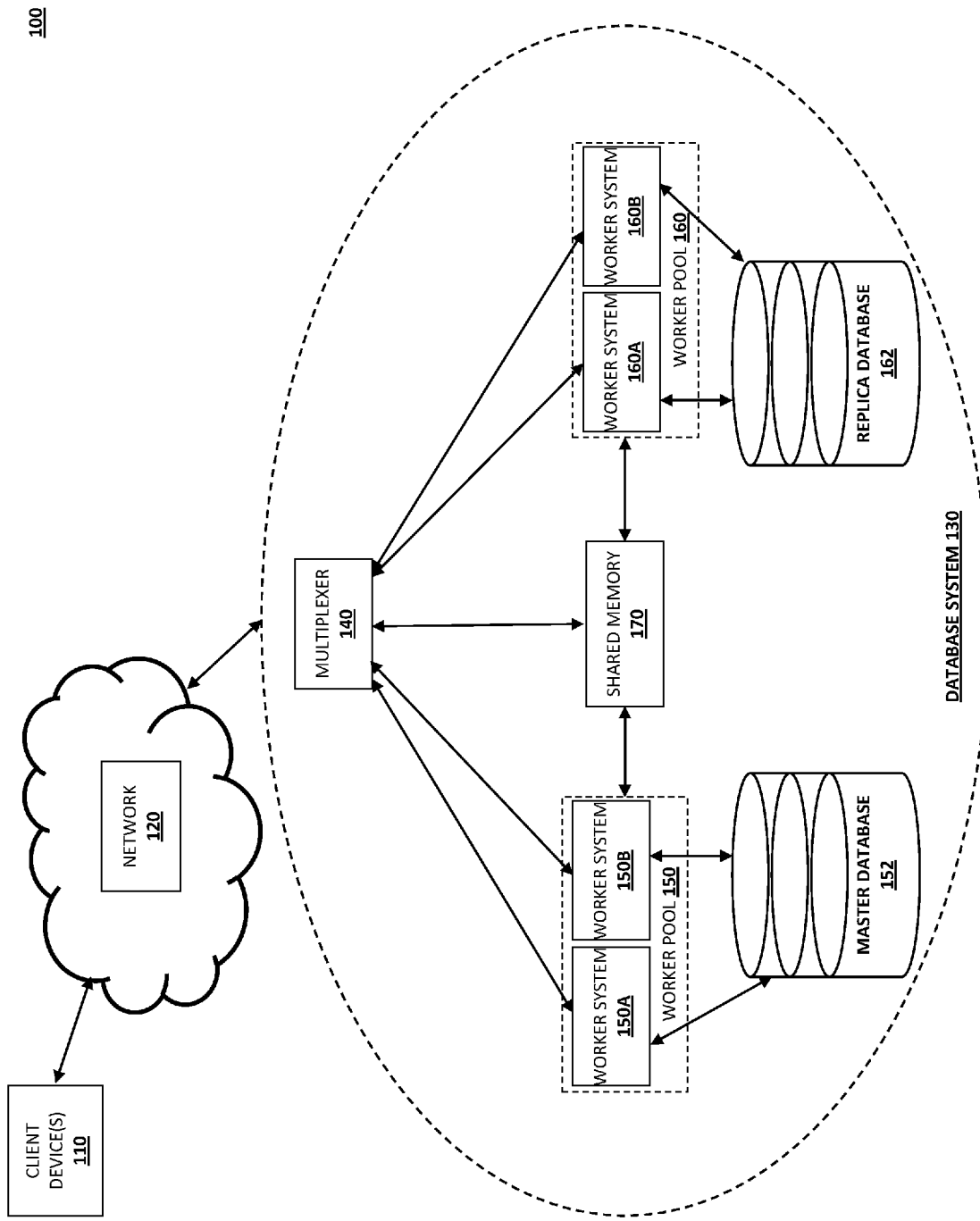
FIG. 1 is a schematic view illustrating an embodiment of a networked system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for improving query performance for reads and writes of a database system. Query performance may be measured by the time required to return results of a read query or to write data to a database for a write query. In one embodiment, a database system includes a multiplexer which receives database queries from a requesting client. The multiplexer may perform an invalidation query to determine whether a version number of a replicated copy of a database or replica database is equal to or newer than a version number of a record of committed data of the database stored in a primary or master database. If the version number of the replicated data is equal to or newer than the committed data, the database query may be routed to a replica database. If the version number of the replicated data is not equal to or newer than the version number of the committed data, the query is routed to a master or primary version of the database.

Referring now to FIG. 1, a first embodiment of a networked system 100 is illustrated. The networked system 100 includes one or more client devices 110 that are coupled to a network 120. A database system 130 is coupled to the network 120. Database system 130 may include, in one embodiment, a multiplexer 140. Multiplexer 140 may receive client requests from clients 110 over network 120, and determine how the client requests are routed, as will be further described below.

Also within database system 130 are worker pools 150 and 160. Worker pool 150 may include, in one embodiment, worker systems 150A-150B, each of which executes one or more worker threads or processes. Although two worker systems 150A-150B are depicted, any number of worker systems may be included in database system 130 as part of worker pool 150, depending on the implementation of embodiments described herein. Worker systems 150A-150B, and more specifically, worker threads or processes executing on worker systems 150A-150B, may be coupled to and configured to read and write data from and to a master or primary database 152. In one embodiment, master database 152 is an ORACLE database, but other database systems (e.g., SAP, MySQL, MongoDB, etc.) are contemplated and within the scope of the instant disclosure.

Worker pool 160, similar to worker pool 150, may include worker systems 160A-160B, each of which executes one or more worker threads or processes. Again, although two worker systems 160A-160B are depicted, any number of worker systems may be included in database system 130 as part of worker pool 160, depending on the implementation of embodiments described herein. Worker systems 160A-160B, and more specifically, worker threads or processes executing on worker systems 160A-160B, may be coupled to and configured to read and write data from and to a replica database 162. As with master database 152, in one embodiment, replica database 162 is an ORACLE database, but other database systems are contemplated and within the scope of the instant disclosure. In one embodiment, database system 130 may include multiple replica databases 162.

Also within database system 130 is shared memory 170. Shared memory 170 may be implemented in a separate computing system, such as a server system with a large amount of random access memory that can be accessed quickly. Shared memory 170 may be used, in some embodiments described below, to store configuration information for routing and version numbers of data in the master database and replica database. For example, shared memory 170 may store a configuration table that includes an identification of queries that may be routed to a replica database. Shared memory 170 may also store an invalidation table for each query that may be routed. Shared memory 170 may also store a version number, such as a system change number, for the master database and any replica databases.

In the embodiments discussed below, database system 130 may be used by a payment service provider or other entity to store data for various applications, such as one or more payment service provider applications, including checkout application, money sending application, and/or other payment service provider applications. Other applications may include back-end or back-office type applications, such as web server software, mobile-device applications, and other applications. As such, the database system 130 may maintain data for various applications using the master database 152 and replica database 162. One of skill in the art in possession of the present disclosure will recognize that the systems and methods of the present disclosure will be beneficial to a wide variety of applications provided by a wide variety of different system providers. As such, while specific references are made to a payment service provider providing the systems and methods of the present disclosure, any system provider utilizing the teachings of the present disclosure to manage data within a database system is envisioned as falling within the scope of the present disclosure.

The client devices 110, database system 130, multiplexer 140, worker systems 150A-150B and 160A-160B, master database 152, replica database 162, and shared memory 170 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 120.

The client devices 110 may be implemented using any appropriate combination of hardware and/or software configured for wired and/or wireless communication over network 120. For example, in one embodiment, the client devices 110 may be implemented as a personal computer of a user in communication with the Internet. In other embodiments, the client devices 110 may be a server device, smart phone, laptop computer, wearable computing device, and/or other types of computing devices. The client devices 110 may include one or more browser applications which may be used, for example, to provide a convenient interface to permit users to browse information available over the network 120. For example, in one embodiment, the browser application may be implemented as a web browser configured to view information available over the Internet. The client devices 110 may also include one or more toolbar applications which may be used, for example, to provide user-side processing for performing desired tasks in response to operations selected by the user. In one embodiment, the toolbar application may display a user interface in connection with the browser application. The client devices 110 may further include other applications as may be desired in particular embodiments to provide desired features to the client devices 110. The other applications may also include security applications for implementing user-side security features, programmatic user applications for interfacing with appropriate application programming interfaces (APIs) over the network 120, or other types of applications. Email and/or text applications may also be included, which allow the user to send and receive emails and/or text messages through the network 120. The client device 110 include one or more user and/or device identifiers which may be implemented, for example, as operating system registry entries, cookies associated with the browser application, identifiers associated with hardware of the client device 110, or other appropriate identifiers, such as a phone number.

The network 120 may be implemented as a single network or a combination of multiple networks. For example, in various embodiments, the network 120 may include the Internet and/or one or more intranets, landline networks, local area networks, wide area networks, wireless networks, and/or other appropriate types of networks.

Consistent with the above, increasing performance of a database system by reducing response time is an area of interest for businesses and other entities that regularly rely on database systems for their operation and for transacting business. Embodiments described improve response time for database queries by routing certain queries to replica read-only replica copies of databases instead of a master database, which may distribute the query load among multiple databases and free the master database for operations which include writes or modifications to the database. Accordingly, overall computing and input/output requirements on a master or primary database may be reduced significantly.

Figure 2:
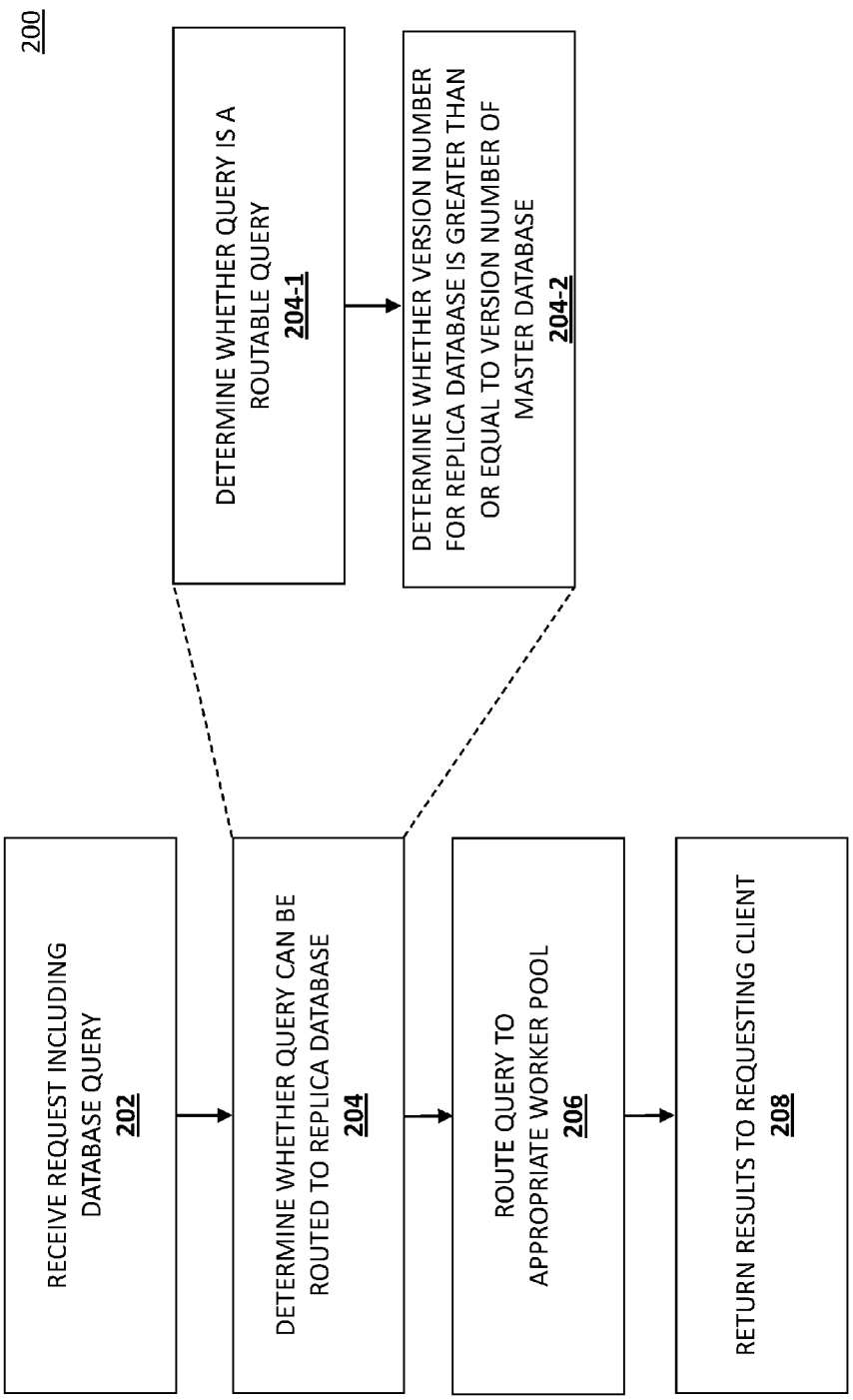
FIG. 2 is a flow chart illustrating an embodiment of a method for routing queries to a database system.

Referring now to FIG. 2, an embodiment of a method 200 for routing queries to a replica database is illustrated. In the embodiments and examples discussed below, the database systems are referred to as database systems for a customer-facing transactional application. However, other applications are also possible, including payment applications such as checkout applications, donate money to charity applications, and/or a wide variety of other types of payment applications known in the art. Furthermore, as discussed above, a wide variety of non-payment applications will benefit from the teachings of the present disclosure and are envisioned as falling within its scope. Such applications may be provided by a payment provider service or other system provider, and/or may include other applications that require database systems.

The method 200 begins at block 202 where a request including a database query is received. In one embodiment, the database query is formatted in structured query language (SQL). In one embodiment, the database query is received from client 110 by multiplexer 140 of database system 130 over network 120. In one embodiment, client 110 is a client such as a user requesting data from the database system 130. Additionally, or alternatively, client 110 may be another computing device executing software, such as a web server or application server executing software which relies upon data stored in database system 130.

Block 204 includes a determination of whether the database query may be routed to a read-only replica database, such as replica database 160. In one embodiment, the determination is part of an invalidation query. The invalidation query may determine, for example, whether the database query of the request is a routable query, for example, at block 204-1. For example, the invalidation query may consult or query a configuration table stored in the master database to determine whether the query can be routed. The invalidation query may also consult or query an invalidation table which may maintain, for each query, a version number of data in the master database and a version number of data in of the replica database. For example, at block 204-2, the invalidation query may thus determine, based in part on the invalidation table, whether a version number of data in the replica database 162 for the query is greater than or equal to a version number of data in the master database 152 for the query. In one example, if a query uses three tables, the invalidation table may store the oldest version number of the three tables in a record for the query in the invalidation table. That version number may be compared against the version number for data in the master database to determine whether the query can be routed to a replica database.

In one embodiment, the configuration table may be periodically read from the primary or master database, and may be stored in the shared memory. The configuration table may be periodically read by a lead primary worker thread executing on a worker system such as worker system 150A-150B. In one embodiment, a global version number of the replica database may be periodically read from the replica database and may be stored in the shared memory. The global version number of the replica database may be periodically read by a lead replica worker thread executing on a worker system such as worker system 160A-160B.

In one embodiment, the determination at block 204 involves additional component determinations. For example, when a database query in a request is received, and the client connection for the database query is assigned to a write worker thread or system, the multiplexer may determine that the query cannot be routed. If the query is a read query, then the determination may further include scanning the client request to determine if it is a routable query based on the configuration table. The invalidation table may then be queried to get a version number for the query, i.e., the invalidation table may store each query in a row, and the version number for the row may represent the version number for the master database for the results of that query. The replica database version number stored in the shared memory may then be compared against the version number for the master database. If the replica database version number is greater than or the same as the version number for the master database (from the row of the invalidation table), then the query may be routed to the replica database. Otherwise, the query may not be routed to the replica database. If the query is a read query but is not configured as routable, the query is not routed to the replica database.

Based on the results of the determination at block 204, method 200 proceeds to block 206. At block 206, the database query in the request is routed to the appropriate worker pool, whether worker pool 150 corresponding to the master database 152 or worker pool 160 corresponding to replica database 162. The worker pool may perform the query on the appropriate database, whether the master or replica, and at block 208, return results to the requesting client.

In one embodiment, portions of the database system may need to be configured before query routing may occur. Thus, for example, along with the setup of a configuration table and invalidation table in the master database, database triggers may be needed. Such database triggers may be needed for all tables in the primary database involved in any configured query. Thus, for example, if a first query retrieves results from three tables of a database, each table may have its own database trigger. The database trigger, upon a change to any data in a table for a query, updates the invalidation table for the query with the newest version number for each table. In one embodiment, a change to the data in a table occurs in response to a sequence of database queries, which may be defined in a data manipulation language (DML) statement. In one embodiment, the trigger and DML statement may be included in the same commit request, such that the invalidation table entries will have the same version number as the entries of the table of the master database.

In one embodiment, a new configuration variable in a database configuration may be added to the database configuration to enable or disable a query routing feature. Additionally, a variable to control the number of standby children may be added to the database configuration.

In one embodiment, the schema for the routing configuration table may include various columns or fields for each query or row. One such field included in the schema of the table may be the hash of a query to be routed. Another field included in the schema of the table may be the text of the query. The schema of the table may also include a yes or no value if the query is to be routed or not. The schema of the table also includes an identification of the invalidation table, and may also include a where clause for the invalidation table. The schema may also include a field for a variable if the query is always to be routed to a standby or replica database. Finally, the schema may include a field to represent whether routing for the query is enabled or not.

Based on the database query in the request and the configuration table, the routing configuration system (which may be performed by the multiplexer) may return an invalidation query corresponding to the input query, which determines whether the query can be routed as described above.

In one embodiment, when the routing is enabled, and when a read-write split feature is also enabled, the database system may have three types of worker processes. A first type of worker process may be a write process, which connects to a primary or master database, and takes a read or write request. The write process may be labeled in a log file as "[WORKER]". A second type of worker process may be a read only worker process, which connects to the primary database, only takes read requests, and is identified in a log as "[R-WORKER]". A third type of worker process may be a standby worker process, which connects to the replica database, takes only qualified or safe read requests, and is identified in a log as "[S-WORKER]".

In one embodiment, child dispatch or switch logic may be changed to accommodate the query routing feature. For example, when a client connection is already addressed to a write worker process, routing may not be triggered as a client session may be in the middle of a database transaction. Subsequent queries will thus continue to be sent to the write worker process. In one embodiment, the invalidation query is always sent to a read only or write worker process. Further, in one embodiment, if a client connection is already assigned to a standby worker, and a new request with a database query is received, the client connection may have to switch to a read only worker process or a write worker process. Thus, a child switch mechanism may be used to send a message to the standby or replica worker process.

In one embodiment, the multiplexer may need to scan a netstring process using a snooper application to retrieve a full SQL syntax, any bind names, and corresponding bind variables.

Thus, systems and methods for reducing query response times and improving primary or master database performance by routing read only queries to replica databases, thereby reducing the load on a master database. The systems and methods of the present disclosure provide substantial benefits over conventional solutions by, for example, spreading query load over multiple databases while ensuring the most recent results are returned to requesting clients. While the volume of queries to a master database may stay constant or increase slightly with query routing, because of invalidation table queries, the invalidation table queries are less computationally expensive than other read queries, and thus, the overall computational expense on the primary database decreases. An additional table may be needed in the master database for the invalidation table. Additionally, for routing enabled tables in the master database, the number of DML operations may increase, up to double, because of the trigger to update the invalidation table. Finally, if a routing enabled query involves a multiple table join, triggers on different tables may update the same row in the same invalidation table, which may cause lock contention. Thus, not all queries may be suitable for routing, but for those that are suitable for routing, the benefits described above may be achieved. Queries that are suitable for routing may be those with heavy reads and light writes, while tables with heavy writes may cause a load increase with routing enabled.

Figure 3:
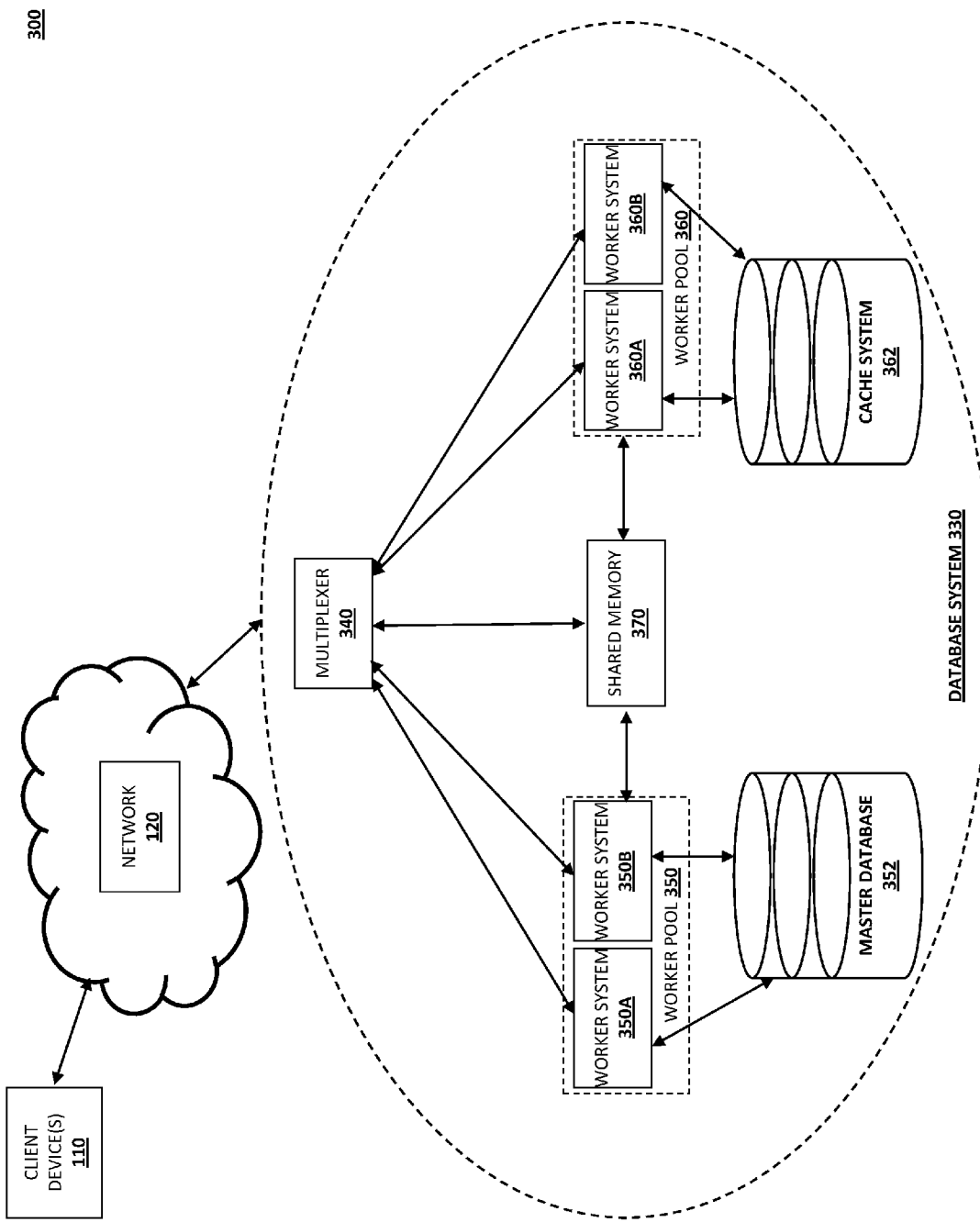
FIG. 3 is a schematic view illustrating a further embodiment of a networked system.

Referring now to FIG. 3, a further embodiment of a networked system 300 is illustrated. The networked system 300 includes one or more client devices 110 that are coupled to a network 120. In FIG. 3, a further embodiment of a database system 330 is coupled to the network 120. Database system 330 may include, in one embodiment, a multiplexer 340. Multiplexer 340 may receive client requests from clients 110 over network 120, and determine how the client requests are routed, as will be further described below.

Also within database system 130 are worker pools 350 and 360. Worker pool 350 may include, in one embodiment, worker systems 350A-350B, each of which executes a worker thread or process. Although two worker systems 350A-350B are depicted, any number of worker systems may be included in database system 330 as part of worker pool 350, depending on the implementation of embodiments described herein. Worker systems 350A-350B may be coupled to and configured to read and write data from and to a master database 352. In one embodiment, master database 352 is an ORACLE database, but other database systems (e.g., SAP, MySQL, MongoDB, etc.) are contemplated and within the scope of the instant disclosure.

Worker pool 360 may include worker systems 360A-360B, each of which executes a worker thread or process. Again, although two worker systems 360A-360B are depicted, any number of worker systems may be included in database system 330 as part of worker pool 360, depending on the implementation of embodiments described herein. Worker systems 360A-360B may be coupled to and configured to read data from a cache storage system 362. Thus, networked system 300 and database system 330 differ from networked system 100 and database system 130 in that, instead of a replica database 162, a cache system 362 may be used to return the results of a query. In one embodiment, cache system 362 is a distributed cache system including multiple server devices, which may store data in memory or solid state storage with response times quicker than that of typical platter-based disks. In one embodiment, database system 330 may include multiple cache systems 362.

Also within database system 330 is shared memory 370. Shared memory 370 may be implemented in a separate computing system, such as a server system with a large amount of random access memory that can be accessed quickly. Shared memory 370 may be used, in some embodiments described below, to store configuration information for query caching and version numbers of data in the master database and cache system. For example, shared memory 370 may store a configuration table that includes an identification of queries that may be cached and thus queries for which a result set may be retrieved from the cache system 362. Shared memory 370 may also store an invalidation table which stores information about rows which are changed in a given table in response to a transaction. For example, if a row in a table named "wuser" is updated, there is a corresponding "wuser inv" table. Shared memory 170 may also store a version number, such as a system change number, for the master database.

In the embodiments discussed below, as with database system 130, database system 330 may be used by a payment service provider or other entity to store data for various applications, such as one or more payment service provider applications, including checkout application, money sending application, and/or other payment service provider applications.

As with networked system 100 of FIG. 1, the client devices 110, database system 330, multiplexer 340, worker systems 350A-350B and 360A-360B, master database 352, cache system 362, and shared memory 370 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 300, and/or accessible over the network 120.

Embodiments described with reference to FIG. 3 improve response time for database queries by routing certain queries to a cache system storing result sets of database queries. Thus, for example, a set of queries may be identified that are frequently received by the database system, but which do not have result sets that change frequently. Such result sets can be stored in a cache system, and thus, the database system can return results quicker from the cache system instead of needing to query a master database, freeing the master database for operations which include writes or modifications to the database. Accordingly, overall computing and input/output requirements on a master or primary database may be reduced significantly.

Figure 4:
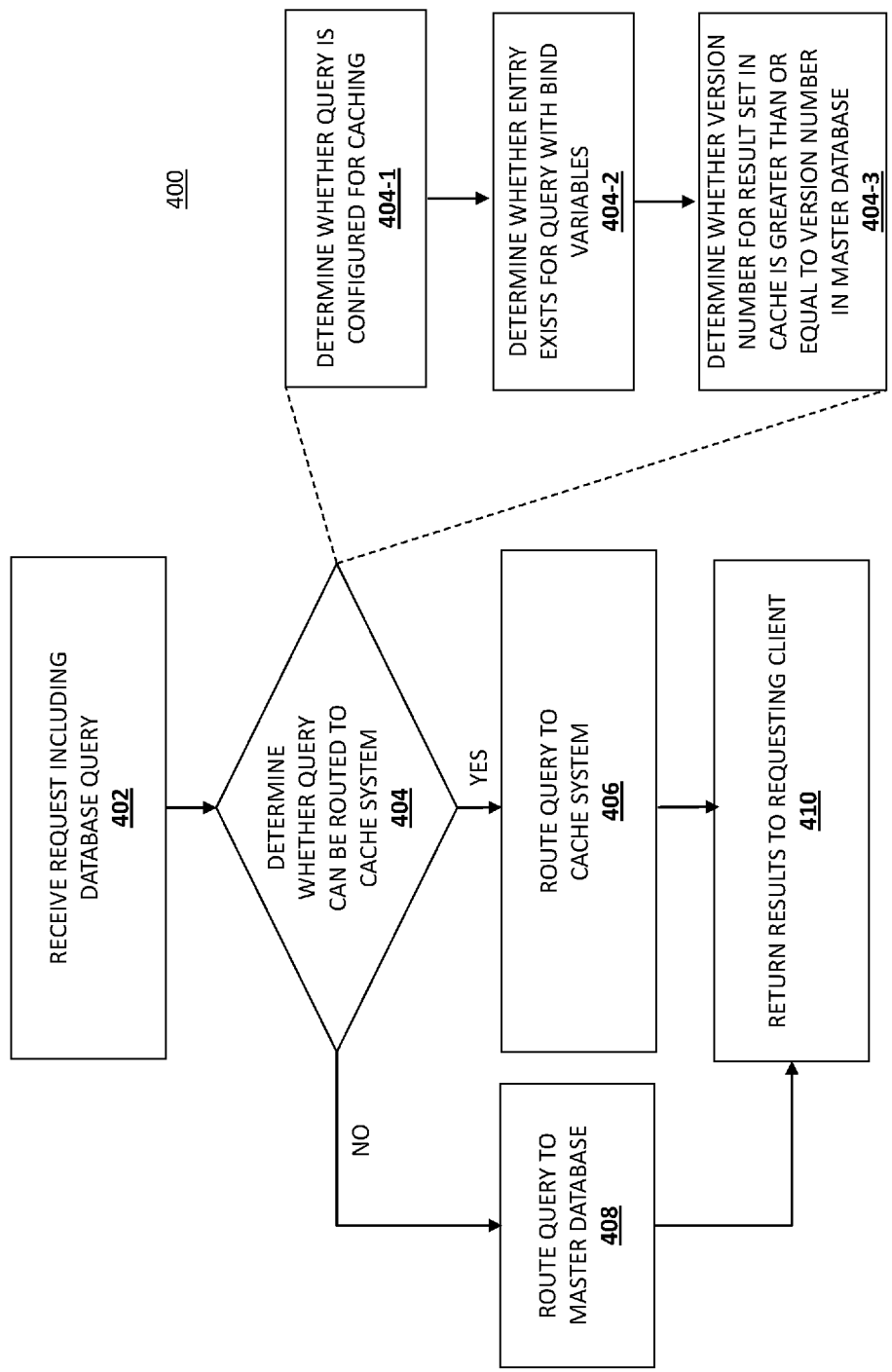
FIG. 4 is a flow chart illustrating a further embodiment of a method for routing queries to a database system.

Referring now to FIG. 4, an embodiment of a method 400 for routing queries to a cache system is illustrated. In the embodiments and examples discussed below, the database systems are referred to as database systems for a customer-facing transactional application. However, other applications are also possible, including payment applications such as checkout applications, donate money to charity applications, and/or a wide variety of other types of payment applications known in the art. Furthermore, as discussed above, a wide variety of non-payment applications will benefit from the teachings of the present disclosure and are envisioned as falling within its scope. Such applications may be provided by a payment provider service or other system provider, and/or may include other applications that require database systems.

The method 400 begins at block 402 where a request including a database query is received. In one embodiment, the database query is formatted in structured query language (SQL). In one embodiment, the database query is received from client 110 by multiplexer 340 of database system 330 over network 120. In one embodiment, client 110 is a client such as a user requesting data from the database system 330. Additionally, or alternatively, client 110 may be another computing device executing software, such as a web server or application server executing software which relies upon data stored in database system 330.

Block 404 includes a determination of whether the database query may be routed to a cache system, such as cache system 404. In one embodiment, the determination at block 404 includes a determination as to whether the particular query is configured for caching, for example, at block 404-1. For example, in one embodiment, only "select" type queries are configured for caching, since those queries do not require modification to any data stored in a primary or master database. Similarly, only a subset of "select" queries may be configured for caching, and in particular, those queries whose result sets rarely change may only be configured for caching.

In one embodiment, if the particular query is configured for caching, a second determination is performed on the cache system, for example, at block 404-2. Specifically, the cache system is queried to determine if there is an entry for the query with the parameters specified in the query. In one embodiment, the parameters for the query include bind variables of the query.

If the cache system reports that there is an entry for the query with the parameters specified in the query, a further determination occurs. In one embodiment, the determination consults the invalidation table to determine whether there is an entry for the query and the parameters in the invalidation table. In one embodiment, if there is no entry in the invalidation table for the query and the parameters, then the determination at block 404 proceeds to block 406. Additionally, in one embodiment, if the invalidation table identifies that the version number of the result set in the cache system is greater than or equal to the version number of data in the master database, for example, at block 404-3, the determination at block 404 also proceeds to block 406. If none of the above determinations returns a positive result, method 400 proceeds to block 408.

At block 406, the result set corresponding to the query and the parameters or bind variables of the query is retrieved from the cache system. The database query may be routed to the worker pool for the cache system, and at block 410, the result set may be returned to the requesting client. If, at block 404, method 400 instead proceeds to block 408, the master database is queried with the query and the bind variables. Thus, the database query is routed to the primary database worker pool, and at block 410, the result set is returned to the requesting client. Additionally, a variable to control the maximum size of a result set to be cached may be set in the database configuration. Further, a variable to enable logging by the cache system to an application log may be set. By default, the logging variable may be set to false to maintain performance. A variable to enable or disable compression of data in the cache system may also be set. In one embodiment, data is compressed by default. Further, in one embodiment, the compression may use the zlib compression library, although other compression libraries may be used as well. A configuration variable that sets a minimum chunk size for fetching data from the cache may also be set. Finally, the number of invalidation query statements cached may be set in a configuration variable, with a default of 50.

In one embodiment, the schema for the routing configuration table may include various columns or fields for each query or row, many of which may be similar to those described above with respect to the query routing. One such field included in the schema of the table may be the hash of a query to be routed. Another field included in the schema of the table may be the text of the query. The schema of the table may also include a yes or no value if the query is to be routed or not. The schema of the table also includes an identification of the invalidation table, and may also include a where clause for the invalidation table. The schema may also include a field for a variable if the query is always to be routed to a standby or replica database. The schema may also include a field to represent whether routing for the query is enabled or not. Additional fields for the caching feature may include a time to live value for the query. Also, a flag may be set for the query if caching is enabled or not. Finally, a query identifier may be used for the caching feature.

Based on the database query in the request and the configuration table, the routing configuration system (which may be performed by the multiplexer) may return an invalidation query corresponding to the input query, which determines whether the result set for the query can be retrieved from the cache as described above.

In one embodiment, the caching configuration is encapsulated by a particular class used by the database system. A lead worker process may read the configuration and store the configuration in the shared memory 370, from where other worker processes or systems can read the configuration as needed. In one embodiment, the caching logic may be encapsulated by a query cache class. When a query is requested for execution, a worker process may check if the query is configured for caching. If the query is configured for caching, the worker process will perform a look up in the cache system to determine whether the data is already in the cache. The lookup process is performed with a key to the data stored in the cache system. In one embodiment, the key is a 64-bit hash of a string, which includes the query text (e.g., the SQL query text) and the bind parameters or query parameters. For a given cache record, the payload in return includes the length of the key for the record, the key itself for the record (which is a unique key), the version number for the data in the cache record, the number of rows in the record, the number of columns in the record, the column information, which may include the column name, type, width, precision, and scale for each column, and the data, which may include for each element the number of rows and columns. In one embodiment, if compression is enabled, the payload in return is compressed (e.g., with a zlib library) and encrypted before being stored. The encryption may use, in one embodiment, an AES 256 bit encryption.

Thus, systems and methods for reducing query response times and improving primary or master database performance by retrieving result sets for certain queries from a quickly accessed cache, which may store data in memory instead of disk storage, which thereby reduces the load on a master database and reduces response times. The systems and methods of the present disclosure provide substantial benefits over conventional solutions by, for example, ensuring the most recent results are returned to requesting clients for queries which do not have result sets that differ significantly over time, but which are frequently accessed.

Figure 5:
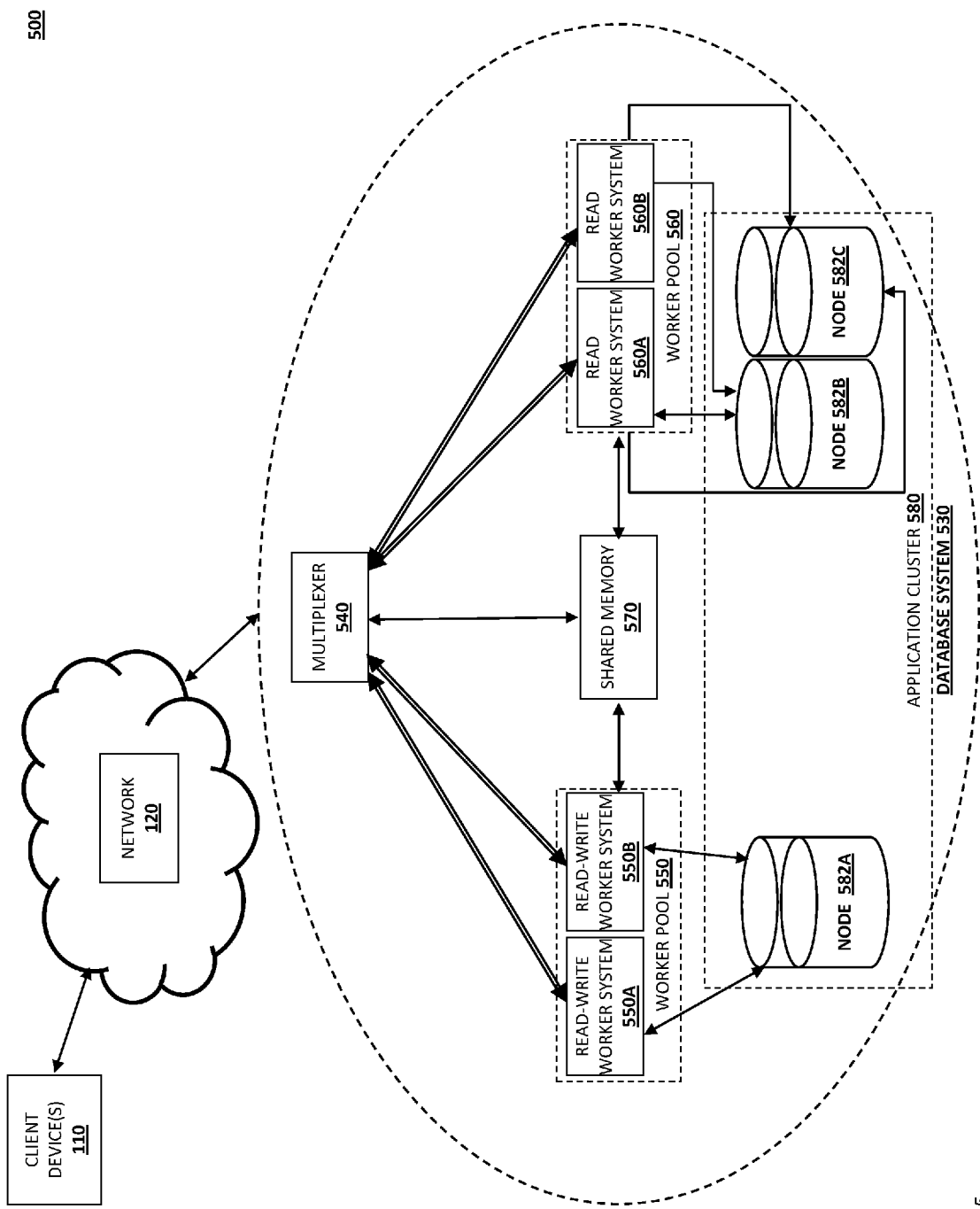
FIG. 5 is a schematic view illustrating a further embodiment of a networked system.

Referring now to FIG. 5, an embodiment of a networked system 500 is illustrated. The networked system 500 includes one or more client devices 110 that are coupled to a network 120. In FIG. 5, a second embodiment of a database system 530 is coupled to the network 120. Database system 530 may include, in one embodiment, a multiplexer 540. Multiplexer 540 may receive client requests from clients 110 over network 120, and determine how the client requests are routed, as will be further described below.

Also within database system 530 are worker pools 550 and 560. Worker pool 550 may be a read-write worker pool, and may include, in one embodiment, read-write worker systems 550A-550B, each of which executes a read-write worker thread. Although two worker systems 550A-550B are depicted, any number of worker systems may be included in database system 530 as part of worker pool 550, depending on the implementation of embodiments described herein. Worker systems 550A-550B may be may be coupled to and configured to read and write data from and to a node 582A in an application cluster 580. In one embodiment, application cluster 580 is an ORACLE real application cluster, but other database systems and application clusters (e.g., SAP, MySQL, MongoDB, etc.) are contemplated and within the scope of the instant disclosure. In one embodiment, a data channel and control channel may transmit data between multiplexer 540 and worker systems 550A-550B, and between multiplexer 540 and worker systems 560A-560B.

Worker pool 560 may be a read worker pool, and may include read worker systems 560A-560B, each of which executes a read worker thread. Again, although two read worker systems 560A-560B are depicted, any number of read worker systems may be included in database system 530 as part of read worker pool 560, depending on the implementation of embodiments described herein. Worker systems 560A-560B may be coupled to and configured to read data from nodes 582B-582C in application cluster 580. Additional nodes 582 are possible and contemplated, depending on the implementation of embodiments described herein. In one embodiment, a data channel and control channel may transmit data between multiplexer 540 and worker systems 560A-560B.

Also within database system 530 is shared memory 570. Shared memory 570 may be implemented in a separate computing system, such as a server system with a large amount of random access memory that can be accessed quickly. Shared memory 570 may be used, in some embodiments described below, to store configuration information which includes client connection status and the states of any worker processes executing on worker systems 550A-550B or 560A-560B.

In the embodiments discussed below, as with database system 130, database system 530 may be used by a payment service provider or other entity to store data for various applications, such as one or more payment service provider applications, including checkout application, money sending application, and/or other payment service provider applications.

As with networked system 100 of FIG. 1, the client devices 110, database system 530, multiplexer 540, worker systems 550A-550B and 560A-560B, nodes 582A-582C, and shared memory 570 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 500, and/or accessible over the network 120.

Embodiments described with reference to FIG. 5 improve the performance of a database system by routing certain read-only queries to read nodes in an application cluster, freeing a single write node for write queries of the database. Thus, for example, upon receipt of a query, a multiplexer may determine whether the query is a read or write query, and direct the query to an appropriate worker system. Accordingly, overall computing and input/output requirements on a write node of an application cluster for a database may be reduced significantly. In one embodiment, such embodiments are useful in active deployments of application clusters, wherein synchronization of nodes in an application cluster is computationally expensive. This may occur because lock contention for database resources occurs frequently, which affects database performances. In some application clusters, ordered sequences do not scale well if frequently used, and thus, some application cluster providers may recommend the use of a no-order sequence to avoid database contention. However, certain critical applications require the extensive use of ordered sequences; for example, a globally unique payment identification in a database may require the use of ordered sequences. Thus, to achieve high performance in an active application cluster, minimization of write contention (or sequence contention) must occur among nodes in an application cluster. Thus, embodiments described herein separate read and write traffic to different nodes in a cluster.

Figure 6:
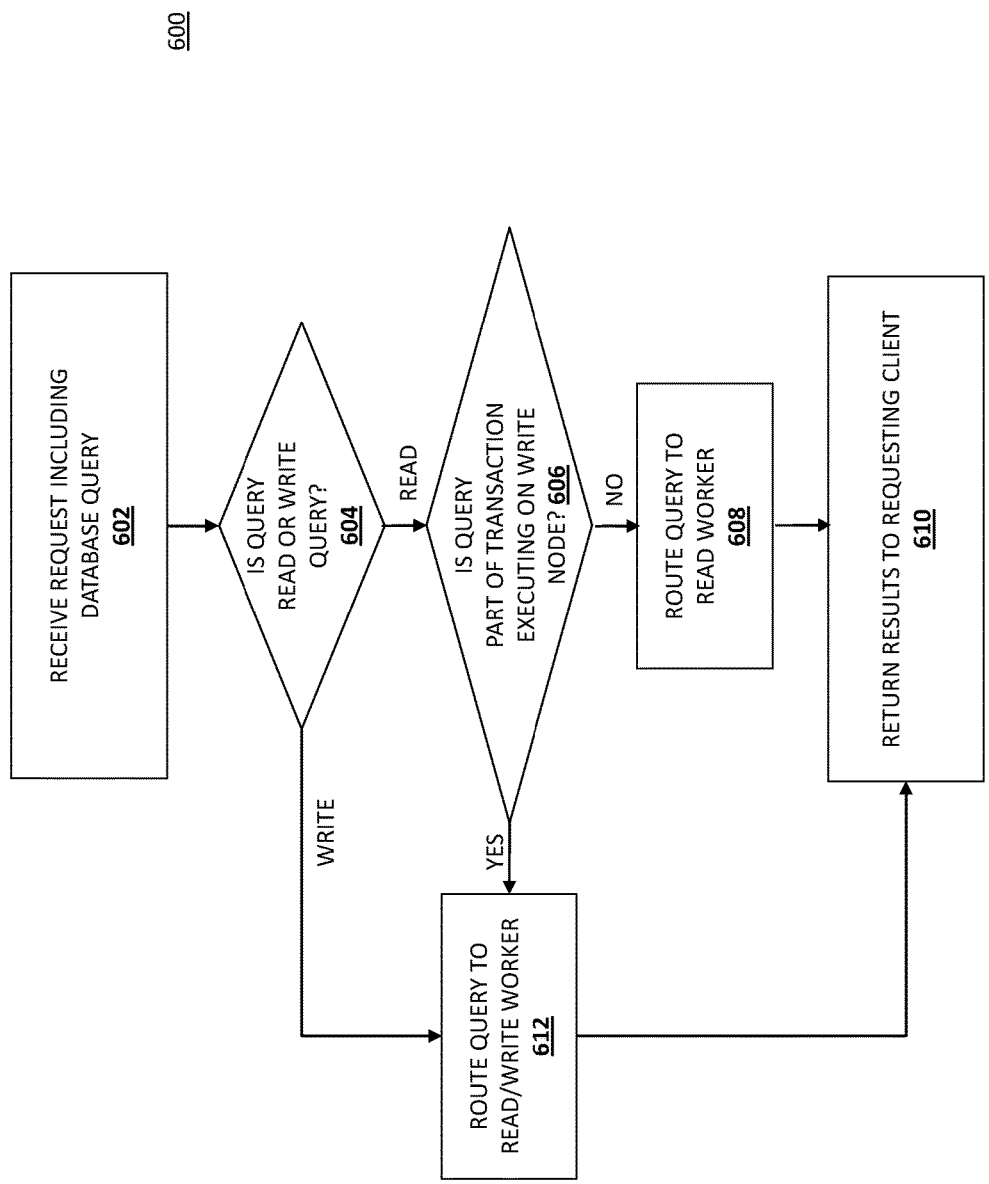
FIG. 6 is a flow chart illustrating a further embodiment of a method for routing queries to a database system.

Referring now to FIG. 6, an embodiment of a method 600 for routing queries to a worker node is described. In the embodiments and examples discussed below, the database systems are referred to as database systems for a customer-facing transactional application. However, other applications are also possible, including payment applications such as checkout applications, donate money to charity applications, and/or a wide variety of other types of payment applications known in the art. Furthermore, as discussed above, a wide variety of non-payment applications will benefit from the teachings of the present disclosure and are envisioned as falling within its scope. Such applications may be provided by a payment provider service or other system provider, and/or may include other applications that require database systems.

The method 600 begins at block 602 where a request including a database query is received. In one embodiment, the database query is formatted in structured query language (SQL). In one embodiment, the database query is received from client 110 by multiplexer 540 of database system 530 over network 120. In one embodiment, client 110 is a client such as a user requesting data from the database system 530. Additionally, or alternatively, client 110 may be another computing device executing software, such as a web server or application server executing software which relies upon data stored in database system 530.

Block 604 includes a determination of whether the database query is a read or write query. In one embodiment, the determination at block 604 includes parsing the query to identify read only operations, such as a "select" clause without an update, or a "select" clause without a "sequence.nextid" instruction. For example, in one embodiment, only "select" type queries are configured to be routed to a read worker pool, since those queries do not require modification to any data stored in a primary or master database. Method 600 then proceeds to block 606.

At block 606, a determination is made as to whether the database query is part of a transaction which is executing on a write node. For example, a "select" type query may be part of a transaction, and may be a query issued after an "update" type query. Because the "update" type query involves a write instruction, it execute on the write node of the application cluster. Thus, to preserve transactional safety, in one embodiment, a read query which is part of a transaction that includes writes to the database is executed on the write node as well. By contrast, a read query which is not part of a transaction that includes a write may execute on the read node of the cluster.

As one example, a transaction may include writing a dollar amount of a transaction, and then reading that value. If the read query is directed to a read-only worker, the application cluster may not have committed the written value to the database, and thus the read query will return an error or an inaccurate value. Thus, as described above, the read query is directed to the same connection on the write node until the transaction ends, and no further parsing occurs.

At block 608, if the query is a read query and is not part of a transaction that begins on the write node of the application cluster, the query is transmitted or routed to a read worker system 560A-560B for execution. At block 610, the result set may be returned to the requesting client. If, at blocks 604 and 606, the multiplexer determines that the query is a write query, or is a read query that is part of a transaction that began on the write node, method 600 instead proceeds to block 612, where the query is routed to a read/write worker, and the write node is queried with the query. Thus, the database query is routed to the write worker pool, and at block 610, the query results are returned to the requesting client. In some implementations of embodiments described herein, the load on a write node was reduced by 50% using one write node and two read-only nodes. Additionally, contention, processor usage, and interconnect traffic was reduced in database servers.

Thus, three techniques have been described which improve the performance of a database system: query routing to a replica database, query caching, and read/write split. In accordance with the embodiments described, various pools of worker systems may be required: a read worker pool, a write worker pool, a replica worker pool, and a cache worker pool. Accordingly, each multiplexer may need to manage multiple pools of workers. This may cause one multiplexer to run out of workers and start rejecting requests, while another multiplexer still has free workers. As more pools are introduced, such a problem becomes worse. Further, to scale the database servers when payload sizes increase, more multiplexer processes may be added to the database system, reducing the number of workers for each multiplexer.

Figure 7:
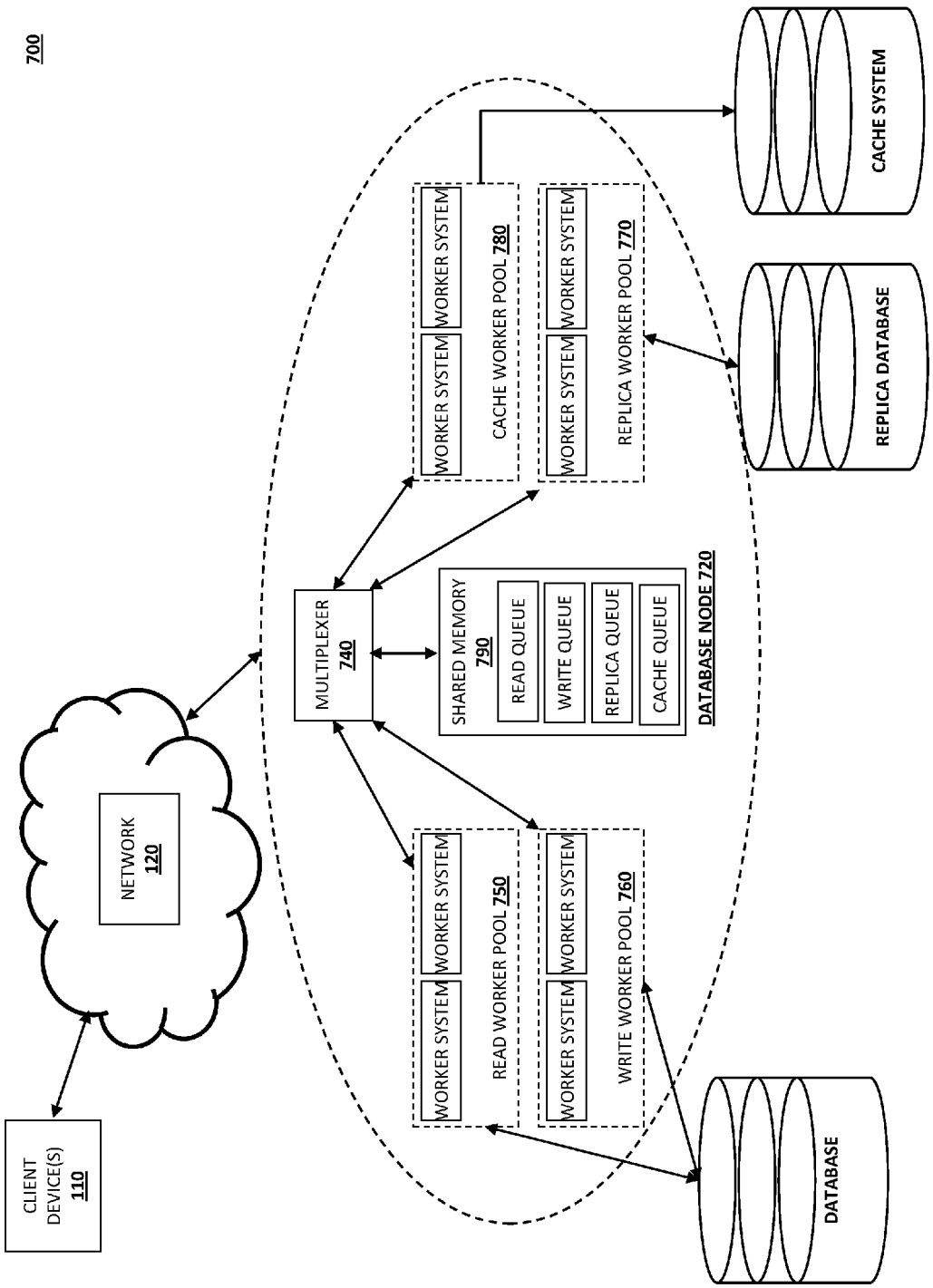
FIG. 7 is a schematic view illustrating a further embodiment of a networked system.

To solve some of the above issues, in one embodiment, worker pools are global resources shared among all multiplexer processes. Such an embodiment is depicted in FIG. 7, in which each multiplexer 740 (which may be a multiplexer as described with reference to multiplexer 140, 340, or 540) in a database node 720 has access to a shared memory 790 (which may be a shared memory as described with reference to shared memory 170, 370, or 570), and which also has access to read worker pool 750, write worker pool 760, replica worker pool 770, and cache worker pool 780. Each pool includes one or more worker systems, as described above with reference to FIGS. 1, 3, and 5. Shared memory 790 may include a read queue, a write queue, a replica queue, and a cache queue, corresponding to each pool of workers.

Thus, each worker resource in one of the worker pools 750, 760, 770, and 780 may become a global resource, instead of a local resource to a single multiplexer. Multiplexers may share the global worker pool through queues in the shared memory. In one embodiment, queues are protected by mutual exclusion (mutex) locks in the shared memory. Additionally, in one embodiment, each type of resource pool has two corresponding queues in the shared memory: an idle queue, used by the multiplexer to dispatch a client request; and a recycle queue, used by a server manager process to recycle the worker.

Additionally, in one embodiment, cache read logic may be moved out of a read worker process and instead included as part of cache worker pool 780. Thus, if caching becomes slow, database capacity is not impacted; rather, only the cache worker pool 780 is affected. Thus, having a separate cache worker pool may allow both query routing and query caching to occur in the database system, instead of one or the other.

In some instances, all database resources may be utilized, which may lead to a condition referred to as resource saturation. Typically, resource utilization is low, but if some database queries start taking longer to execute, then resource saturation may occur. This may happen, for example, if some queries cause lock contention at the database, or a poorly written query is executed. In one embodiment, connection bouncing or request backlogs may be used to handle resource saturation. However, additional methods of protecting from resource saturation are possible in one embodiment as well. For example, actively identifying and thereafter aborting long-running queries may be used to make room for new database requests.

Thus, in one embodiment, the database system may allow a certain amount of backlog or backlogged requests. In one embodiment, the database system may allow a default value of 30% backlogged requests; the default value may be configured depending on the implementations of embodiments described herein. When the backlog percentage is reached, in one embodiment, the database system may begin rejecting new connection requests (e.g., bouncing requests). until the backlog threshold drops below the configured value.

In one embodiment, the database system may include an automatic recovery feature which permits the database system to recover a database resource in the event a requesting client application abandons a database connection, due to a time-out or a crash of the client application. A multiplexer of the database system may detect such an event, and send a control message to a worker system or worker process if such a worker is assigned at the point in time that the event happens. The worker may then go through a recovery process, which may include cancelling the pending query, issuing a rollback if a transaction is in progress, and cleaning up any associated data structures. Upon successful recovery, the worker process may then accept a request from another client. If recovery is not successful, a database session may be terminated. The automatic recovery feature may be leveraged to free resources (such as resources with the longest running query execution time) in the event of resource situation.

In one embodiment, requests may be bounced by a bouncer process started by the multiplexer of the database system. Multiple multiplexer processes may be started to provide scalability across multiple cores. The multiplexer processes may listen on a configured port, and start up a pool of worker processes. The multiplexer processes and worker processes may attach to the shared memory to publish connection and worker related states, which in turn may be reported by a multiplexer manager process periodically into a state log. A bouncer process may also read the state log in the shared memory to take an action (i.e., bounce a requests) when needed. The shared memory may store, for each multiplexer process, connection states and worker or resource states.

In one embodiment, in the event of resource saturation, a multiplexer process may take the following actions. First, the multiplexer process may stop accepting new connection requests. Second, the multiplexer process may recover the longest running sessions. To determine the longest running session, the multiplexer may simply recover the session with the longest running query, or may also recover the session with the longest running query which exceeds a pre-specified threshold time. In one embodiment, the multiplexer may recover the session with the longest running query execution time, where the query execution time exceeds a set number of multiples of the average query execution time. When resources have been recovered or freed such that saturation is below the backlog threshold, new connection requests may be accepted.

In one embodiment, additional configuration values may be used in the saturation recovery feature. For example, a saturation recover threshold variable, with a default value of 200 milliseconds, may be used. Sessions with the longest running queries which exceed the threshold variable may be recovered. Setting the saturation recover threshold variable to zero may mean that the system recovers any session with the longest running query. Setting the threshold variable to a very large number may have the effect of disabling the feature.

Additionally, a saturation recovery throttle rate variable, with a default value of zero, may be used. The value may range between 0 and 100, corresponding to a percentage of worker processes that can be aborted or terminated. Throttling the saturation recovery rate ensures that there is a limit to how many queries are killed, ensuring that the saturation level improves and is not exacerbated. Setting the level to zero disables the throttle rate.

To calculate query execution time, each individual worker is aware of when a query starts, and when the query ends, for a particular session. The multiplexer may have a global view of all workers' query execution time, as the multiplexer performs the method of determining which process to abort. Shared memory may be used to communicate the query start time between the multiplexer and a worker process.

Determining the query execution time by the multiplexer may include, in one embodiment, saving the start time of a query when the query begins and passing the start time to a worker process whenever the worker process is created. The worker process may then set a query start time offset before calling a call interface function in the shared memory. The query start time offset may be calculated by subtracting the multiplexer start time from the current time, and saving the result (in milliseconds) using a 32 bit unsigned integer. Using a 32 bit program, a 32 bit integer read/write operation is an atomic event; thus, a lock for synchronization when a worker process writes and a multiplexer reads the value is not needed. If the offset is zero, in one embodiment, the offset is adjusted by 1. Zero may represent that the query is not executing. After the call interface function is returned, the worker process unsets the start time offset to zero in the shared memory.

For each worker process, the multiplexer calculates the query execution time using a formula, after reading the query start time offset from the shared memory. If the multiplexer current time offset is less than the worker process query start time offset, then the execution time is set to the unit maximum, plus one, minus the difference between the worker process query start time offset and the multiplexer current time offset. Otherwise, the query execution time is set to the difference between the multiplexer current time offset and the worker query start time offset.

Thus, the recovery process may occur when all of the following criteria are met. First, the multiplexer must be out of capacity, i.e., the backlog queue size reaches a backlog percentage variable. Additionally, the longest query execution time must be greater than the saturation recovery threshold variable. Further, the number of outstanding stranded worker processes must be less than the maximum allowed, as defined by the throttle rate. The throttle rate may be the ceiling of the saturation recovery throttle rate multiplied by the maximum number of children per proxy. Finally, if the read/write worker process split is enabled, then the read/write capacity is checked separately, and the corresponding longest running worker process is killed.

In one embodiment, the recovery process is done one worker process at a time. The frequency of the recovery process may be controlled by a timed event. Thus, for example, the recovery event may be scheduled based on the saturation recovery throttle rate and the maximum number of children per proxy. In one example, if the maximum number of children per proxy is 20, and the throttle rate is 30, then the recovery event is scheduled for every 1000/6 milliseconds. When the backlog queue size is down to zero, the recovery event may be temporarily disabled.

When the multiplexer identifies a worker process to be recovered, in one embodiment, the multiplexer may close the client connection, and follow a standard stranded worker recover process. Various labels may be assigned to different types of stranded worker processes.

Figure 8:
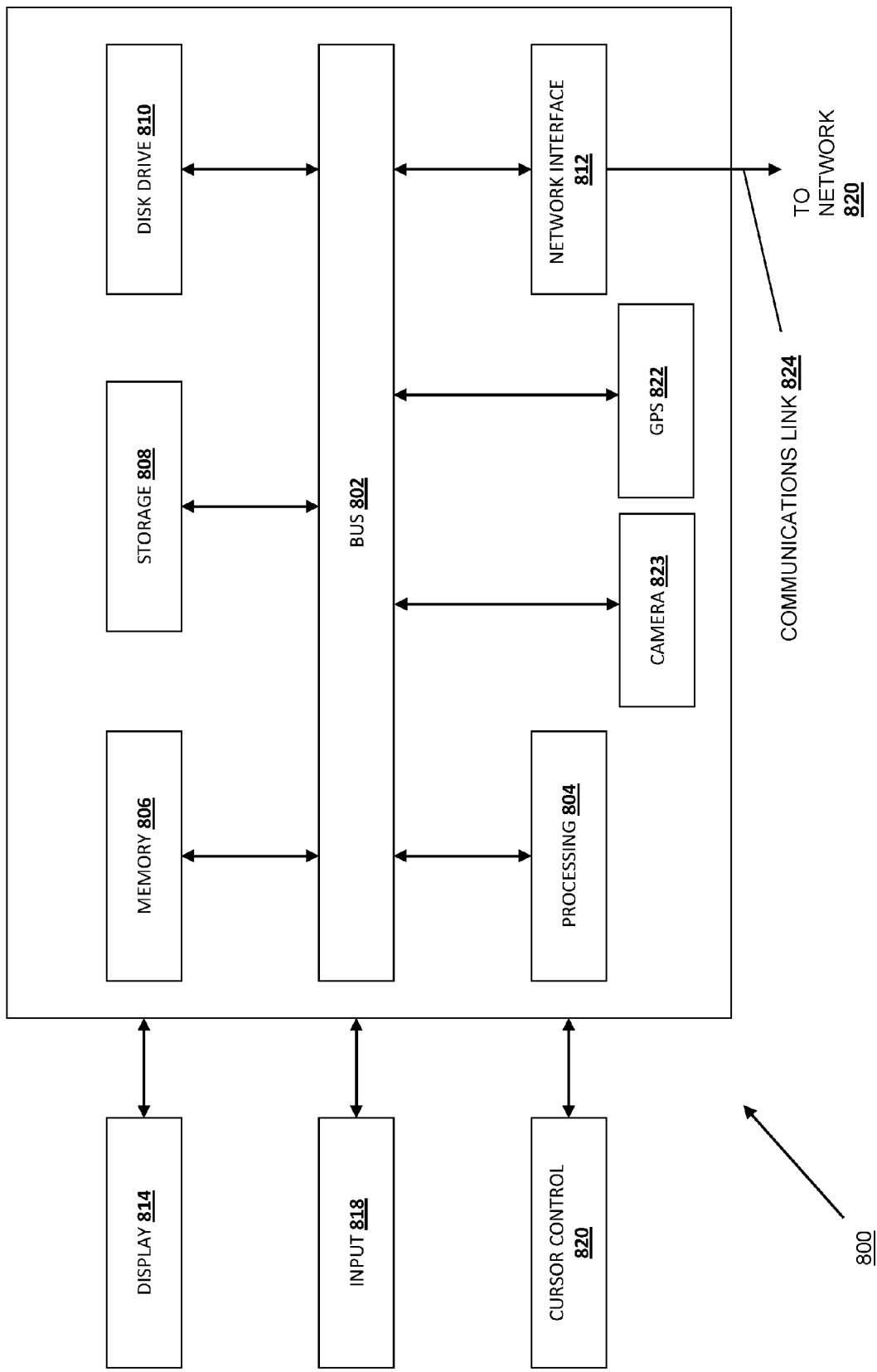
FIG. 8 is a schematic view illustrating an embodiment of a computing device, such as a database system.

Referring now to FIG. 8, an embodiment of a computer system 800 suitable for implementing, for example, the client device 110, multiplexer 140, worker systems 150A-150B, 160A-160B, master database 152, replica database 162, shared memory 170, other components of database system 130, multiplexer 340, worker systems 350A-350B, 360A-360B, master database 352, cache system 362, shared memory 370, multiplexer 540, read-write worker systems 550A-550B, read worker systems 560A-560B, nodes 582A-582C, shared memory 570, other components of database system 530, other components of application cluster 580, multiplexer 740, read worker pool 750, write worker pool 760, replica worker pool 770, cache worker pool 780, and shared memory 790, is described. It should be appreciated that other devices utilized by users, clients, administrative users, customers, merchants, payment service providers, system providers, or any other types of users in the system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), a location determination component 822 (e.g., a Global Positioning System (GPS) device as illustrated, a cell tower triangulation device, and/or a variety of other location determination devices known in the art), and/or a camera component 823. In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the client device 110, multiplexer 140, worker systems 150A-150B, 160A-160B, master database 152, replica database 162, shared memory 170, other components of database system 130, multiplexer 340, worker systems 350A-350B, 360A-360B, master database 352, cache system 362, shared memory 370, multiplexer 540, read-write worker systems 550A-550B, read worker systems 560A-560B, nodes 582A-582C, shared memory 570, other components of database system 530, other components of application cluster 580, multiplexer 740, read worker pool 750, write worker pool 760, replica worker pool 770, cache worker pool 750, and/or shared memory 790. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 120 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A database system, comprising:
    a database application cluster comprising a read-write node and a plurality of read nodes;
    a shared memory; and
    a multiplexer coupled to the database application cluster and shared memory, and comprising a non-transitory memory and one or more hardware processors coupled to the non-transitory memory and configured to read instructions from the non-transitory memory to cause the multiplexer to perform operations comprising:
    receiving a request from a client computing system, wherein the request comprises a database query;
    determining that the database query is a read query which is not included in a transaction executing on the read-write node of the database application cluster;
    determining, based at least on a lookup in the shared memory and the determination that the database query is a read query not included in a transaction executing on the read-write node, whether the database query can be routed to one of the plurality of read nodes; and
    routing the database query to one of the plurality of read nodes for execution if the determination is that the database query can be routed to one of the plurality of read nodes.

2. The system of claim 1, wherein the operations further comprise:
    returning results of an executed database query to the client computing system.

3. The system of claim 1, wherein the operations further comprise:
    routing the database query to the read-write node for execution if the determination is that the database query cannot be routed to one of the plurality of read nodes.

4. The system of claim 3, wherein determining that the database query cannot be routed to one of the plurality of read nodes includes determining that the database query is part of a transaction executing on the read-write node of the database application cluster.

5. The system of claim 1, wherein routing the database query to one of the plurality of read nodes for execution further includes routing the database query to a read worker system in a worker pool.

6. The system of claim 1, the operations further comprising:
updating, in the shared memory and by a worker system coupled to the read-write node, a state of a worker process executing on the worker system.

7. The system of claim 1, wherein determining that the database query is a read query further includes parsing the query to identify a read only operation.

8. A method for providing data from a database system in response to a query, comprising:
receiving, by a multiplexer of the database system, a request from a client computing system, wherein the request comprises a database query;
determining that the database query is a read query which is not included in a transaction executing on a read-write node of a database application cluster comprising a plurality of read nodes;
determining, by the multiplexer and based at least on a lookup in a shared memory coupled to the multiplexer and the database application cluster and on the determination that the database query is a read query not included in a transaction executing on the read-write node, whether the database query can be routed to one of the plurality of read nodes; and
routing, by the multiplexer, the database query to one of the plurality of read nodes for execution if the determination is that the database query can be routed to one of the plurality of read nodes.

9. The method of claim 8, further comprising returning results of an executed database query to the client computing system.

10. The method of claim 8, further comprising:
routing the database query to the read-write node for execution if the determination is that the database query cannot be routed to one of the plurality of read nodes.

11. The method of claim 10, wherein determining that the database query cannot be routed to one of the plurality of read nodes further comprises determining that the database query is part of a transaction executing on the read-write node of the database application cluster.

12. The method of claim 8, wherein routing the database query to one of the plurality of read nodes for execution further includes routing the database query to a read worker system in a worker pool for execution.

13. The method of claim 8, further comprising updating, in the shared memory and by a worker system coupled to the read-write node, a state of a worker process executing on the worker system.

14. The method of claim 8, wherein determining that the database query is a read query further includes parsing the query to identify a read only operation.

15. A non-transitory machine-readable medium having stored thereon machine-readable instructions executable to cause a machine to perform operations comprising:
receiving, by a multiplexer of a database system, a request from a client computing system, wherein the request comprises a database query;
determining that the database query is a read query which is not included in a transaction executing on a read-write node of a database application cluster comprising a plurality of read nodes;
determining, by the multiplexer and based at least on a lookup in a shared memory coupled to the multiplexer and the database application cluster and on the determination that the database query is a read query not included in a transaction executing on the read-write node, whether the database query can be routed to one of the plurality of read nodes; and
routing, by the multiplexer, the database query to one of the plurality of read nodes for execution if the determination is that the database query can be routed to one of the plurality of read nodes.

16. The non-transitory machine-readable medium of claim 15, the operations further comprising returning results of an executed database query to the client computing system.

17. The non-transitory machine-readable medium of claim 15, the operations further comprising:
routing the database query to the read-write node for execution if the determination is that the database query cannot be routed to one of the plurality of read nodes.

18. The non-transitory machine-readable medium of claim 17, wherein determining that the database query cannot be routed to one of the plurality of read nodes further comprises determining that the database query is part of a transaction executing on the read-write node of the database application cluster.

19. The non-transitory machine-readable medium of claim 15, wherein routing the database query to one of the plurality of read nodes for execution further includes routing the database query to a read worker system in a worker pool for execution.

20. The non-transitory machine-readable medium of claim 15, wherein determining that the database query is a read query further includes parsing the query to identify a read only operation.

* * * * *